United States Patent
Ahmad

(10) Patent No.: US 8,239,304 B1
(45) Date of Patent: Aug. 7, 2012

(54) METHOD AND SYSTEM FOR PROVIDING PRE-APPROVED TARGETED PRODUCTS

(75) Inventor: Farhan Ahmad, Philadelphia, PA (US)

(73) Assignee: JPMorgan Chase Bank, N.A., Wilmington, DE (US)

( * ) Notice: Subject to any disclaimer, the term of this patent is extended or adjusted under 35 U.S.C. 154(b) by 2314 days.

(21) Appl. No.: 10/373,164

(22) Filed: Feb. 26, 2003

Related U.S. Application Data

(60) Provisional application No. 60/398,835, filed on Jul. 29, 2002.

(51) Int. Cl.
G06Q 40/00 (2012.01)

(52) U.S. Cl. .......................................... 705/36

(58) Field of Classification Search .................. 705/35, 705/38, 44
See application file for complete search history.

(56) References Cited

U.S. PATENT DOCUMENTS

| | | |
|---|---|---|
| 3,634,669 A | 1/1972 | Soumas et al. |
| 3,946,206 A | 3/1976 | Darjany |
| 4,047,033 A | 9/1977 | Malmberg et al. |
| 4,465,206 A | 8/1984 | Sorel et al. |
| 4,545,838 A | 10/1985 | Minkus et al. |
| 4,582,985 A | 4/1986 | Lofberg |
| 4,614,861 A | 9/1986 | Pavlov et al. |
| 4,634,845 A | 1/1987 | Riley |
| 4,689,478 A | 8/1987 | Hale et al. |
| 4,700,055 A | 10/1987 | Kashkashian, Jr. |
| 4,746,787 A | 5/1988 | Okada |
| 4,750,119 A | 6/1988 | Robertson |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,822,985 A | 4/1989 | Boggan et al. |
| 4,831,242 A | 5/1989 | Englehardt |
| 4,831,526 A | 5/1989 | Luchs |
| 4,837,422 A | 6/1989 | Dethloff et al. |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |

(Continued)

FOREIGN PATENT DOCUMENTS

CA 2293321 12/1998

(Continued)

OTHER PUBLICATIONS

CardEx Incentives, Apr. 6, 1999, www.cardexco.com 15 pages.

(Continued)

*Primary Examiner* — Jessica Lemieux
(74) *Attorney, Agent, or Firm* — Hunton & Williams LLP

(57) ABSTRACT

According to one embodiment, the present invention relates to a method and a system for offering a consumer an opportunity to purchase one or more targeted products and/or services with a pre-approved credit instrument where the selection of one or more products is based on consumer related profile information, which may include previous spending habits, previous transactions and/or other information. Some or all aspects of an offer for the targeted product or service, which may include product type, offer delivery, pricing and payment terms, may be determined by various factors, such as the consumer's credit-worthiness, profile information and/or other information.

18 Claims, 2 Drawing Sheets

U.S. PATENT DOCUMENTS

| | | | |
|---|---|---|---|
| 4,906,826 A | 3/1990 | Spencer | |
| 4,908,521 A | 3/1990 | Boggan et al. | |
| 4,923,288 A | 5/1990 | Allen et al. | |
| 4,928,001 A | 5/1990 | Masada | |
| 4,941,090 A | 7/1990 | McCarthy | |
| 4,943,707 A | 7/1990 | Boggan | |
| 4,953,085 A | 8/1990 | Atkins | |
| 4,954,985 A | 9/1990 | Yamazaki | |
| 4,961,142 A | 10/1990 | Elliott et al. | |
| 4,968,873 A | 11/1990 | Dethloff et al. | |
| 4,975,840 A | 12/1990 | DeTore et al. | |
| 4,978,401 A | 12/1990 | Bonomi | |
| 4,992,940 A | 2/1991 | Dworkin | |
| 5,025,372 A | 6/1991 | Burton et al. | |
| 5,049,728 A | 9/1991 | Rovin | |
| 5,055,662 A | 10/1991 | Hasegawa | |
| 5,080,748 A | 1/1992 | Bonomi | |
| 5,095,194 A | 3/1992 | Barbanell | |
| 5,117,355 A | 5/1992 | McCarthy | |
| 5,146,068 A | 9/1992 | Ugawa et al. | |
| 5,175,416 A | 12/1992 | Mansvelt | |
| 5,180,901 A | 1/1993 | Hiramatsu | |
| 5,192,947 A | 3/1993 | Neustein | |
| 5,202,286 A | 4/1993 | Nakatani | |
| 5,202,826 A | 4/1993 | McCarthy | |
| 5,206,488 A | 4/1993 | Teicher | |
| 5,206,803 A | 4/1993 | Vitagliano | |
| 5,214,700 A | 5/1993 | Pinkas et al. | |
| 5,218,631 A | 6/1993 | Katz | |
| 5,247,190 A | 9/1993 | Friend et al. | |
| 5,276,311 A | 1/1994 | Hennige | |
| 5,287,268 A | 2/1994 | McCarthy | |
| 5,287,269 A | 2/1994 | Dorrough et al. | |
| 5,297,026 A | 3/1994 | Hoffman | |
| 5,311,594 A | 5/1994 | Penzias | |
| 5,326,959 A | 7/1994 | Perazza | |
| 5,326,960 A | 7/1994 | Tannenbaum | |
| 5,328,809 A | 7/1994 | Holmes et al. | |
| 5,339,239 A | 8/1994 | Manabe et al. | |
| 5,349,633 A | 9/1994 | Katz | |
| 5,350,906 A | 9/1994 | Brody et al. | |
| 5,359,183 A | 10/1994 | Skodlar | |
| 5,361,062 A | 11/1994 | Weiss et al. | |
| 5,365,575 A | 11/1994 | Katz | |
| 5,383,113 A | 1/1995 | Knight | |
| 5,397,881 A | 3/1995 | Mannik | |
| 5,399,502 A | 3/1995 | Friend et al. | |
| 5,401,527 A | 3/1995 | Holmes et al. | |
| RE34,915 E | 4/1995 | Nichtberger et al. | |
| 5,408,417 A * | 4/1995 | Wilder | 705/5 |
| 5,424,524 A | 6/1995 | Ruppert et al. | |
| 5,450,477 A | 9/1995 | Amarant et al. | |
| 5,453,601 A | 9/1995 | Rosen | |
| 5,455,407 A | 10/1995 | Rosen | |
| 5,457,305 A | 10/1995 | Akel et al. | |
| 5,459,306 A * | 10/1995 | Stein et al. | 235/383 |
| 5,465,206 A | 11/1995 | Hilt et al. | |
| 5,466,919 A | 11/1995 | Hovakimian | |
| 5,471,669 A | 11/1995 | Lidman | |
| 5,477,038 A | 12/1995 | Levine et al. | |
| 5,477,040 A | 12/1995 | Lalonde | |
| 5,479,494 A | 12/1995 | Clitherow | |
| 5,482,139 A | 1/1996 | Rivalto | |
| 5,483,444 A | 1/1996 | Malark | |
| 5,483,445 A | 1/1996 | Pickering | |
| 5,500,514 A | 3/1996 | Veeneman et al. | |
| 5,511,114 A | 4/1996 | Stimson et al. | |
| 5,512,654 A | 4/1996 | Holmes et al. | |
| 5,513,102 A | 4/1996 | Auriemma | |
| 5,521,363 A | 5/1996 | Tannenbaum | |
| 5,530,232 A | 6/1996 | Taylor | |
| 5,530,235 A | 6/1996 | Stefik et al. | |
| 5,537,314 A | 7/1996 | Kanter | |
| 5,544,086 A | 8/1996 | Davis et al. | |
| 5,544,246 A | 8/1996 | Mandelbaum et al. | |
| 5,553,120 A | 9/1996 | Katz | |
| 5,577,109 A | 11/1996 | Stimson et al. | |
| 5,578,808 A | 11/1996 | Taylor | |
| 5,581,064 A | 12/1996 | Riley et al. | |
| 5,585,787 A | 12/1996 | Wallerstein | |
| 5,590,038 A | 12/1996 | Pitroda | |
| 5,592,560 A | 1/1997 | Deaton et al. | |
| 5,604,542 A | 2/1997 | Dedrick | |
| 5,608,785 A | 3/1997 | Kasday | |
| 5,612,868 A | 3/1997 | Off | |
| 5,621,787 A | 4/1997 | McKoy et al. | |
| 5,621,812 A | 4/1997 | Deaton et al. | |
| 5,637,845 A | 6/1997 | Kolls | |
| 5,638,457 A | 6/1997 | Deaton et al. | |
| 5,642,279 A | 6/1997 | Stone | |
| 5,642,485 A | 6/1997 | Deaton et al. | |
| 5,644,723 A | 7/1997 | Deaton et al. | |
| 5,644,727 A | 7/1997 | Atkins | |
| 5,649,114 A | 7/1997 | Deaton et al. | |
| 5,649,117 A | 7/1997 | Landry | |
| 5,649,118 A | 7/1997 | Carlisle et al. | |
| 5,653,914 A | 8/1997 | Holmes et al. | |
| 5,659,741 A | 8/1997 | Eberhardt | |
| 5,664,110 A | 9/1997 | Green et al. | |
| 5,664,157 A | 9/1997 | Takahira et al. | |
| 5,665,953 A | 9/1997 | Mazzamuto | |
| 5,672,678 A | 9/1997 | Holmes et al. | |
| 5,675,607 A | 10/1997 | Alesio et al. | |
| 5,675,662 A | 10/1997 | Deaton et al. | |
| 5,677,955 A | 10/1997 | Doggett et al. | |
| 5,684,291 A | 11/1997 | Taskett | |
| 5,687,322 A | 11/1997 | Deaton et al. | |
| 5,689,100 A | 11/1997 | Carrithers et al. | |
| 5,689,650 A | 11/1997 | McClelland et al. | |
| 5,692,132 A | 11/1997 | Hogan | |
| 5,696,907 A | 12/1997 | Tom | |
| 5,699,528 A | 12/1997 | Hogan | |
| 5,703,344 A | 12/1997 | Bezy et al. | |
| 5,704,046 A | 12/1997 | Hogan | |
| 5,705,798 A | 1/1998 | Tarbox | |
| 5,708,422 A | 1/1998 | Blonder et al. | |
| 5,710,458 A | 1/1998 | Iwasaki | |
| 5,710,886 A | 1/1998 | Christensen et al. | |
| 5,710,887 A | 1/1998 | Chelliah | |
| 5,710,889 A | 1/1998 | Clark et al. | |
| 5,715,399 A | 2/1998 | Bezos | |
| 5,717,925 A | 2/1998 | Harper et al. | |
| 5,721,768 A | 2/1998 | Stimson et al. | |
| 5,721,781 A | 2/1998 | Deo et al. | |
| 5,726,884 A | 3/1998 | Sturgeon et al. | |
| 5,727,153 A | 3/1998 | Powell | |
| 5,728,998 A | 3/1998 | Novis et al. | |
| 5,729,693 A | 3/1998 | Holda-Fleck | |
| 5,734,154 A | 3/1998 | Jachimowicz et al. | |
| 5,734,838 A | 3/1998 | Robinson | |
| 5,736,728 A | 4/1998 | Matsubara | |
| 5,737,421 A | 4/1998 | Audebert | |
| 5,740,549 A | 4/1998 | Reilly et al. | |
| 5,742,775 A | 4/1998 | King | |
| 5,745,049 A | 4/1998 | Akiyama et al. | |
| 5,745,706 A | 4/1998 | Wolfberg et al. | |
| 5,749,075 A | 5/1998 | Toader et al. | |
| 5,760,381 A | 6/1998 | Stich et al. | |
| 5,765,138 A | 6/1998 | Aycock et al. | |
| 5,765,141 A | 6/1998 | Spector | |
| 5,770,843 A | 6/1998 | Rose et al. | |
| 5,770,849 A | 6/1998 | Novis et al. | |
| 5,774,870 A | 6/1998 | Storey | |
| 5,777,305 A | 7/1998 | Smith et al. | |
| 5,777,306 A | 7/1998 | Masuda | |
| 5,777,903 A | 7/1998 | Piosenka et al. | |
| 5,778,067 A | 7/1998 | Jones et al. | |
| 5,787,156 A | 7/1998 | Katz | |
| 5,787,404 A | 7/1998 | Fernandez-Holman | |
| 5,789,733 A | 8/1998 | Jachimowicz et al. | |
| 5,794,207 A | 8/1998 | Walker | |
| 5,799,087 A | 8/1998 | Rosen | |
| 5,802,176 A | 9/1998 | Audebert | |
| 5,805,719 A | 9/1998 | Pare et al. | |
| 5,806,042 A | 9/1998 | Kelly et al. | |
| 5,806,044 A | 9/1998 | Powell | |
| 5,806,045 A | 9/1998 | Biorge | |

| | | | | | | |
|---|---|---|---|---|---|---|
| 5,807,627 | A | 9/1998 | Friend et al. | 6,014,638 | A | 1/2000 | Burge et al. |
| 5,809,478 | A | 9/1998 | Greco | 6,014,645 | A | 1/2000 | Cunningham |
| 5,815,657 | A | 9/1998 | Williams et al. | 6,014,749 | A | 1/2000 | Gloor et al. |
| 5,815,658 | A | 9/1998 | Kuriyama | 6,016,482 | A | 1/2000 | Molinari et al. |
| 5,819,234 | A | 10/1998 | Slavin et al. | 6,016,954 | A | 1/2000 | Abe et al. |
| 5,819,237 | A | 10/1998 | Garman | 6,019,284 | A | 2/2000 | Freeman et al. |
| 5,826,243 | A | 10/1998 | Musmanno et al. | 6,026,370 | A | 2/2000 | Jermyn |
| 5,832,457 | A | 11/1998 | O'Brien | 6,029,139 | A | 2/2000 | Cunningham et al. |
| 5,832,488 | A | 11/1998 | Eberhardt | 6,029,890 | A | 2/2000 | Austin |
| 5,835,061 | A | 11/1998 | Stewart | 6,032,136 | A | 2/2000 | Brake, Jr. et al. |
| 5,835,576 | A | 11/1998 | Katz | 6,036,099 | A | 3/2000 | Leighton |
| 5,839,113 | A | 11/1998 | Federau et al. | 6,038,292 | A | 3/2000 | Thomas |
| 5,845,259 | A | 12/1998 | West et al. | 6,038,552 | A | 3/2000 | Fleischl et al. |
| 5,845,260 | A | 12/1998 | Nakano et al. | 6,041,315 | A | 3/2000 | Pollin |
| 5,852,811 | A | 12/1998 | Atkins | 6,045,042 | A | 4/2000 | Ohno |
| 5,852,812 | A | 12/1998 | Reeder | 6,047,067 | A | 4/2000 | Rosen |
| 5,857,079 | A | 1/1999 | Claus et al. | 6,047,268 | A | 4/2000 | Bartoli et al. |
| 5,857,175 | A | 1/1999 | Day | 6,049,463 | A | 4/2000 | O'Malley et al. |
| 5,857,709 | A | 1/1999 | Chock | 6,049,773 | A | 4/2000 | McCormack et al. |
| 5,859,419 | A | 1/1999 | Wynn | 6,049,782 | A | 4/2000 | Gottesman et al. |
| 5,864,609 | A | 1/1999 | Cross et al. | 6,058,378 | A | 5/2000 | Clark et al. |
| 5,864,828 | A | 1/1999 | Atkins | 6,064,985 | A | 5/2000 | Anderson |
| 5,864,830 | A | 1/1999 | Armetta et al. | 6,065,675 | A | 5/2000 | Teicher |
| RE36,116 | E | 2/1999 | McCarthy | 6,068,183 | A | 5/2000 | Freeman et al. |
| 5,870,718 | A | 2/1999 | Spector | 6,070,067 | A | 5/2000 | Nguyen et al. |
| 5,870,721 | A | 2/1999 | Norris | 6,070,147 | A | 5/2000 | Harms et al. |
| 5,875,437 | A | 2/1999 | Atkins | 6,070,153 | A | 5/2000 | Simpson |
| 5,883,377 | A | 3/1999 | Chapin, Jr. | 6,076,068 | A | 6/2000 | DeLapa et al. |
| 5,883,810 | A | 3/1999 | Franklin et al. | 6,076,072 | A | 6/2000 | Libman |
| 5,884,271 | A | 3/1999 | Pitroda | 6,078,888 | A | 6/2000 | Johnson, Jr. |
| 5,884,278 | A | 3/1999 | Powell | 6,078,891 | A | 6/2000 | Riordan et al. |
| 5,884,285 | A | 3/1999 | Atkins | 6,091,817 | A | 7/2000 | Bertina et al. |
| 5,887,065 | A | 3/1999 | Audebert | 6,092,056 | A | 7/2000 | Tull, Jr. et al. |
| 5,890,138 | A | 3/1999 | Godin et al. | 6,095,412 | A | 8/2000 | Bertina et al. |
| 5,890,140 | A | 3/1999 | Clark et al. | 6,095,416 | A | 8/2000 | Grant et al. |
| H1794 | H | 4/1999 | Claus | 6,098,053 | A | 8/2000 | Slater |
| 5,897,620 | A | 4/1999 | Walker et al. | 6,105,011 | A | 8/2000 | Morrison, Jr. |
| 5,905,246 | A | 5/1999 | Fajkowski | 6,105,865 | A | 8/2000 | Hardesty |
| 5,907,350 | A | 5/1999 | Nemirofsky | 6,109,525 | A | 8/2000 | Blomqvist et al. |
| 5,911,135 | A | 6/1999 | Atkins | 6,112,191 | A | 8/2000 | Burke |
| 5,911,136 | A | 6/1999 | Atkins | 6,115,458 | A | 9/2000 | Taskett |
| 5,914,472 | A | 6/1999 | Foladare et al. | 6,119,097 | A | 9/2000 | Ibarra |
| 5,920,629 | A | 7/1999 | Rosen | 6,119,932 | A | 9/2000 | Maloney et al. |
| 5,920,844 | A | 7/1999 | Hotta et al. | 6,122,623 | A | 9/2000 | Garman |
| 5,920,847 | A | 7/1999 | Kolling et al. | 6,128,598 | A | 10/2000 | Walker et al. |
| 5,923,734 | A | 7/1999 | Taskett | 6,128,599 | A | 10/2000 | Walker et al. |
| 5,926,800 | A | 7/1999 | Baronowski et al. | 6,129,274 | A | 10/2000 | Suzuki |
| 5,930,217 | A | 7/1999 | Kayanuma | 6,134,536 | A | 10/2000 | Shepherd |
| 5,931,764 | A | 8/1999 | Freeman et al. | 6,138,917 | A | 10/2000 | Chapin, Jr. |
| 5,933,817 | A | 8/1999 | Hucal | 6,145,741 | A | 11/2000 | Wisdom et al. |
| 5,937,068 | A | 8/1999 | Audebert | 6,148,297 | A | 11/2000 | Swor et al. |
| 5,940,811 | A | 8/1999 | Norris | 6,161,096 | A | 12/2000 | Bell |
| 5,952,641 | A | 9/1999 | Korshun | 6,163,770 | A | 12/2000 | Gamble et al. |
| 5,953,423 | A | 9/1999 | Rosen | 6,164,533 | A | 12/2000 | Barton |
| 5,953,710 | A | 9/1999 | Fleming | 6,167,385 | A | 12/2000 | Hartley-Urquhart |
| 5,955,961 | A | 9/1999 | Wallerstein | 6,169,975 | B1 | 1/2001 | White et al. |
| 5,956,695 | A | 9/1999 | Carrithers et al. | 6,173,267 | B1 | 1/2001 | Cairns |
| 5,963,648 | A | 10/1999 | Rosen | 6,182,048 | B1 | 1/2001 | Osborn et al. |
| 5,970,479 | A | 10/1999 | Shepherd | 6,182,894 | B1 | 2/2001 | Hackett et al. |
| 5,970,480 | A | 10/1999 | Kalina | 6,186,793 | B1 | 2/2001 | Brubaker |
| 5,974,399 | A | 10/1999 | Giuliani et al. | 6,189,787 | B1 | 2/2001 | Dorf |
| RE36,365 | E | 11/1999 | Levine et al. | 6,192,113 | B1 | 2/2001 | Lorsch |
| 5,984,180 | A | 11/1999 | Albrecht | 6,195,644 | B1 | 2/2001 | Bowie |
| 5,984,191 | A | 11/1999 | Chapin, Jr. | 6,202,053 | B1 | 3/2001 | Christiansen et al. |
| 5,987,434 | A | 11/1999 | Libman | RE37,122 | E | 4/2001 | Levine et al. |
| 5,988,509 | A | 11/1999 | Taskett | 6,223,143 | B1 | 4/2001 | Weinstock et al. |
| 5,991,413 | A | 11/1999 | Arditti et al. | 6,227,447 | B1 | 5/2001 | Campisano |
| 5,991,743 | A | 11/1999 | Irving et al. | 6,243,688 | B1 | 6/2001 | Kalina |
| 5,991,748 | A | 11/1999 | Taskett | 6,263,316 | B1 | 7/2001 | Khan et al. |
| 5,991,750 | A | 11/1999 | Watson | 6,265,977 | B1 | 7/2001 | Vega et al. |
| 5,999,596 | A | 12/1999 | Walker et al. | 6,278,981 | B1 | 8/2001 | Dembo et al. |
| 6,000,608 | A | 12/1999 | Dorf | 6,295,522 | B1 | 9/2001 | Boesch |
| 6,000,832 | A | 12/1999 | Franklin et al. | 6,298,336 | B1 | 10/2001 | Davis et al. |
| 6,002,383 | A | 12/1999 | Shimada | 6,308,268 | B1 | 10/2001 | Audebert |
| 6,003,762 | A | 12/1999 | Hayashida | 6,324,524 | B1 * | 11/2001 | Lent et al. .................. 705/38 |
| 6,004,681 | A | 12/1999 | Epstein et al. | 6,336,099 | B1 | 1/2002 | Barnett et al. |
| 6,006,988 | A | 12/1999 | Behrmann et al. | 6,338,048 | B1 | 1/2002 | Mori |
| 6,009,415 | A | 12/1999 | Shurling et al. | 6,341,724 | B2 | 1/2002 | Campisano |
| 6,014,636 | A | 1/2000 | Reeder | 6,343,743 | B1 | 2/2002 | Lamla |

| | | |
|---|---|---|
| 6,345,261 B1 | 2/2002 | Feidelson |
| 6,345,766 B1 | 2/2002 | Taskett et al. |
| 6,349,291 B1 | 2/2002 | Varma |
| 6,360,954 B1 | 3/2002 | Barnardo |
| 6,366,220 B1 | 4/2002 | Elliott |
| 6,373,969 B1 | 4/2002 | Adler |
| 6,377,669 B1 | 4/2002 | Walker et al. |
| 6,385,591 B1 | 5/2002 | Mankoff |
| 6,386,444 B1 | 5/2002 | Sullivan |
| 6,397,202 B1 | 5/2002 | Higgins et al. |
| 6,402,039 B1 | 6/2002 | Freeman et al. |
| 6,405,182 B1 | 6/2002 | Cuervo |
| 6,422,459 B1 | 7/2002 | Kawan |
| 6,422,462 B1 | 7/2002 | Cohen |
| 6,424,029 B1 | 7/2002 | Giesler |
| 6,429,927 B1 | 8/2002 | Borza |
| 6,434,259 B1 | 8/2002 | Hamid et al. |
| 6,446,210 B1 | 9/2002 | Borza |
| 6,450,407 B1 | 9/2002 | Freeman et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,484,144 B2 | 11/2002 | Martin et al. |
| 6,484,148 B1 | 11/2002 | Boyd |
| 6,498,861 B1 | 12/2002 | Hamid et al. |
| 6,505,168 B1 | 1/2003 | Rothman et al. |
| 6,505,780 B1 | 1/2003 | Yassin et al. |
| 6,529,880 B1 | 3/2003 | McKeen et al. |
| 6,557,750 B1 | 5/2003 | Druse et al. |
| 6,560,578 B2 | 5/2003 | Eldering |
| 6,574,603 B1 | 6/2003 | Dickson et al. |
| 6,581,839 B1 | 6/2003 | Lasch et al. |
| 6,601,040 B1 | 7/2003 | Kolls |
| 6,601,761 B1 | 8/2003 | Katis |
| 6,609,111 B1 | 8/2003 | Bell |
| 6,611,910 B2 | 8/2003 | Mittal et al. |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,675,127 B2 | 1/2004 | LaBlanc et al. |
| 6,693,544 B1 | 2/2004 | Hebbecker |
| 6,742,704 B2 | 6/2004 | Fitzmaurice et al. |
| 6,745,938 B2 | 6/2004 | Sullivan |
| 6,757,710 B2 | 6/2004 | Reed |
| 6,802,008 B1 | 10/2004 | Ikefuji et al. |
| 6,805,287 B2 | 10/2004 | Bishop |
| 6,865,547 B1 | 3/2005 | Brake, Jr. et al. |
| 6,868,426 B1 | 3/2005 | Mankoff |
| 6,876,971 B1 | 4/2005 | Burke |
| 6,895,386 B1 | 5/2005 | Bachman et al. |
| 6,901,372 B1 | 5/2005 | Helzerman |
| 6,912,502 B1 | 6/2005 | Buddle et al. |
| 6,925,441 B1 * | 8/2005 | Jones et al. .................. 705/10 |
| 6,970,830 B1 | 11/2005 | Samra et al. |
| 6,999,943 B1 | 2/2006 | Johnson et al. |
| 7,006,992 B1 | 2/2006 | Packwood |
| 7,051,925 B2 | 5/2006 | Schwarz, Jr. |
| 7,072,864 B2 | 7/2006 | Brake, Jr. et al. |
| 7,089,503 B1 | 8/2006 | Bloomquist et al. |
| 7,103,573 B2 * | 9/2006 | Mobed et al. .................. 705/56 |
| 7,104,443 B1 | 9/2006 | Paul et al. |
| 7,165,049 B2 | 1/2007 | Slater |
| 2001/0011227 A1 | 8/2001 | Ashery et al. |
| 2001/0011243 A1 | 8/2001 | Dembo et al. |
| 2001/0027441 A1 | 10/2001 | Wankmueller |
| 2001/0034682 A1 | 10/2001 | Knight et al. |
| 2001/0037315 A1 | 11/2001 | Saliba et al. |
| 2001/0044293 A1 | 11/2001 | Morgan |
| 2001/0047342 A1 | 11/2001 | Cuervo |
| 2001/0054003 A1 | 12/2001 | Chien et al. |
| 2001/0056398 A1 | 12/2001 | Scheirer |
| 2002/0019803 A1 | 2/2002 | Muller |
| 2002/0026418 A1 | 2/2002 | Koppel et al. |
| 2002/0032609 A1 * | 3/2002 | Wilkman .................. 705/14 |
| 2002/0046089 A1 * | 4/2002 | Zorn .................. 705/14 |
| 2002/0046255 A1 | 4/2002 | Moore et al. |
| 2002/0062235 A1 | 5/2002 | Wahlbin et al. |
| 2002/0077978 A1 | 6/2002 | O'Leary et al. |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0104878 A1 | 8/2002 | Seifert et al. |
| 2002/0116271 A1 | 8/2002 | Mankoff |
| 2002/0116330 A1 | 8/2002 | Hed et al. |
| 2002/0120627 A1 | 8/2002 | Mankoff |
| 2002/0120642 A1 | 8/2002 | Fetherston |
| 2002/0143703 A1 | 10/2002 | Razvan et al. |
| 2002/0147662 A1 | 10/2002 | Anderson |
| 2002/0165820 A1 | 11/2002 | Anvekar et al. |
| 2002/0174016 A1 | 11/2002 | Cuervo |
| 2002/0194081 A1 | 12/2002 | Perkowski |
| 2003/0004828 A1 | 1/2003 | Epstein |
| 2003/0018613 A1 * | 1/2003 | Oytac .................. 707/1 |
| 2003/0023549 A1 | 1/2003 | Armes et al. |
| 2003/0028518 A1 | 2/2003 | Mankoff |
| 2003/0033211 A1 | 2/2003 | Haines et al. |
| 2003/0033246 A1 | 2/2003 | Slater |
| 2003/0046249 A1 | 3/2003 | Wu |
| 2003/0053609 A1 | 3/2003 | Risafi et al. |
| 2003/0101119 A1 | 5/2003 | Persons et al. |
| 2003/0105672 A1 | 6/2003 | Epstein et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0154125 A1 | 8/2003 | Mittal et al. |
| 2003/0163403 A1 | 8/2003 | Chen et al. |
| 2003/0163416 A1 | 8/2003 | Kitajima |
| 2003/0172040 A1 | 9/2003 | Kemper et al. |
| 2003/0195808 A1 | 10/2003 | Brown et al. |
| 2003/0200143 A9 | 10/2003 | Walker et al. |
| 2003/0200180 A1 | 10/2003 | Phelan et al. |
| 2003/0216965 A1 | 11/2003 | Libman |
| 2004/0024672 A1 | 2/2004 | Brake, Jr. et al. |
| 2004/0030626 A1 | 2/2004 | Libman |
| 2004/0039588 A1 | 2/2004 | Libman |
| 2004/0059952 A1 | 3/2004 | Newport et al. |
| 2004/0093296 A1 | 5/2004 | Phelan et al. |
| 2004/0093303 A1 | 5/2004 | Picciallo |
| 2004/0098351 A1 | 5/2004 | Duke |
| 2004/0243498 A1 | 12/2004 | Duke |
| 2005/0021400 A1 | 1/2005 | Postrel |
| 2005/0027649 A1 | 2/2005 | Cech |
| 2005/0071230 A1 | 3/2005 | Mankoff |
| 2005/0075932 A1 | 4/2005 | Mankoff |
| 2005/0077350 A1 | 4/2005 | Courtion et al. |
| 2005/0091138 A1 | 4/2005 | Awatsu |
| 2005/0171898 A1 | 8/2005 | Bishop et al. |
| 2006/0047589 A1 | 3/2006 | Grau |

FOREIGN PATENT DOCUMENTS

| | | |
|---|---|---|
| EP | 0843292 A2 | 5/1998 |
| EP | 0855659 | 7/1998 |
| EP | 959440 | 11/1999 |
| GB | 2275654 A | 9/1994 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 98/59307 | 12/1998 |
| WO | WO 99/05633 | 2/1999 |
| WO | WO 01/18699 | 3/2001 |
| WO | WO 01/69347 | 9/2001 |
| WO | WO 01/69347 A2 | 9/2001 |
| WO | WO 01/69347 A3 | 9/2001 |
| WO | WO 2005/043277 A3 | 5/2005 |

OTHER PUBLICATIONS

"Associates First Capital Corporation", Hoover's Inc., The Industry Standard: The Newsmagazine of the Internet Economy, thestandard.net/companies/cpmpany-display, Apr. 6, 1999, 2 pages.

Jeffrey M. Lacker, "Stored Value Cards: Costly Private Substitutions for Government Currency", Economic Quarterly, 1996, vol. 82, No. 3, 17 pages.
"The Evolution of a New Consumerism", Chain Store Age, vol. 73, 4 pages, Jun. 1997.
Lisa Fickenscher, "Amex prepaid offering is latest card for firms regarding employees", American Banker, vol. 161, No. 151, p. 11, Aug. 8, 1996.
"Welcome to Swiftgift", Swiftgift, www.swiftgiftcard.com, Dec. 8, 1998, 10 pages.
Lucy Lzarony, "Stuck for a gift? Give a prepaid credit card", www.bankrate.com, Dec. 21, 1998, 2 pages.
Antoinette Coulton, "Incentives field moving to card-based series 14", American Banker, Mar. 26, 1998 pp. 1-3.
Credit Card News, "A store card issuer looks for lift from electronic gift certificates", Feb. 1, 1995 pp. 4.
Stefani C. O'Conner, Business Travel News, "Maritz gets mastercard's stamp of approval", Aug. 19, 1996, 2 pages.
Debit Card News, vol. 2, Issue 2, "Boatman's floats stored value into the employee incentive waters", Jul. 16, 1996, 3 pages.
Mickey Meece, "Boatman's prepaid cards for worker-incentive firm", American Banker, Jul. 2, 1996, 1 page.
Card News, vol. 6, No. 25, "D.C. Area Safeway stores look for increase in sales volume and revenue with cards", Dec. 1991, pp. 1-3.
Ralph E. Spurgin, "Sopininmon! or What's happening in the retail credit card environment", Credit World Journal, Mar. 1997, Credit World, vol. 85, No. 4.
AT&T Marketing, "Universal card free lifetime membership extended 3 months", www.att.com/press/0297/970217.csa.html, Dec. 4, 1990, 2 pages.
Chain Store Age Executive with Shopping Center Age, "More retailers turn to co-branding", Feb. 1, 1995, vol. 71, No. 2, ISSN: 0193-1199, pp. 1-3.
Introducing SpendingMoney™, Armetta: Marketing & Design Product Concept Report, Oct. 9, 1996, 15 pages.
First USA Platinum Connect, First USA Bank, First USA Promotional Mailing, Oct. 1997, pp. 2-6.
Introducing the First USA Platinum Connect Card, First USA Promotional Mailing, Dec. 1997, pp. 1-5.
Here's the calling convenience you asked for: 1-800-call-AT&T . . . For All Calls, Appendix A: For Card Carriers, 7 pages.
Beth Piskora, Debit Cards Seen Poised for New Markets, American Banker, pp. 16, Mar. 7, 1998, 1 page.
Nick Rosen, Cash Just Isn't Flexible Enough: Shops of the Future Will Only Take Cards, Daily Express: Technology Section, Feb. 10, 1995, 1 page.
Phil Britt, Competing in Auto Lending, America's Community Banker, vol. 5, No. 11, pp. 33-37, Nov. 1, 1996, 7 pages.
Miriam Krenin Souccar, Smart Cards: $1^{st}$ Union Smart Card Pilot Enlists a Second Army Base, American Banker, 3 pages.
First Union Issues Smart Cards to Fort Benning Recruits, CardFax, 1 page.
Emerson Brown and Jim Baum, Purchasing Card Magic: Eli Lilly Finds Accounts Payable Flying High With Plastic, Corporate Cashflow, 4 pages, Corporate Cashflow, vol. 15, No. 12, 1994.
AT&T News Release, Monday Feb. 17, 1997, New 1-800-CALL-ATT campaign promotes one number for all calls, 2 pages.
Christine Dugas, Payroll May Ask: Paper or Plastic?, USA Today, 3B, Aug. 14, 2001, 1 pages.
Swift Gift 'Wows' Internet Shoppers, PR Newswire, Wednesday, Dec. 2, 1998, 2 pages.
Incentive Firms Find Debit Cards a Rewarding Experience, No. 11, vol. 3, Nov. 28, 1997, Newsletter ISSN: 1055-176X, 3 pages.
5500—FDIC General Counsel's Opinion No. 8—Stored Value Cards, 61 Fed. Reg. 40490, http://www.fdic.gov/regulations/laws/rules/5500-500.html, Aug. 2, 1996.
Song, A Card That Asks for ID, Time Magazine, Apr. 12, 2004, 1 page.
A Store Card Issuer Looks for Lift from Electronic Gift Certificates, Credit Card News, Feb. 1, 1995, 2 pages.
Claessens, et al., A Tangled World Wide Web of Security Issues, First Monday, retrieved from the Internet at http://www.firstmonday.org/issues/issue7_3/claessens, retrieved from the internet on Oct. 6, 2006.

Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.
American Express Incentive Services, Incentive, Sep. 1996, p. 126.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
Associates First Capital Corporation, Hoover's Inc., The Industry Standard: The Newsmagazine of the Internet Economy, thestandard.net/companies/company-display, Apr. 6, 1999.
Award Card Comparison, JA7922.
Brehl, Banks issue cash-card pledge, The Toronto Star, Oct. 9, 1997, 1 page.
Blockbuster running test of a stored value card, The American Banker, Sep. 1, 1995.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CES/NaBANCO introduces stored value card technology blockbuster video is first merchant partner, Business Wire, Inc., Jan. 15, 1996.
Card Based Award Systems, JA8309.
CardEx Incentives, www.cardex.com, Apr. 6, 1999.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 4958.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Nora Wood, Corporate Spotlight, Incentive, Dec. 1997, 4 pages.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card—Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
Eight Keys to Making the Right Choice, Incentive, Dec. 1996, 9 pages.

D. O'Mahony, Electronic Payment System, 1997, Artech House, XP002137255, p. 7-11.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Exclusively Yours From Maritz . . . The MasterCard Card Ultimate Incentive, Incentive, Oct. 1995, 3 pages.
Block, First Data Subsidiary Creates Payroll Card for the Bankless, LexisNexis Academic, Credit/Debit/ATMs, p. 10, Mar. 21, 1997.
First Data markets stored-value cards, Cards International, Jan. 30, 1996, p. 5.
First USA—Activate Today and Get One Hour Free Calling Card Calls, Call 1-800-555-2535, First USA, 6 pages.
First USA—Call 1(800)335-2453 To Receive One Free Hour of Domestic Long Distance Calling (No Strings Attached), First USA, 6 pages.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Glossman, et al.,, Glossman, et al., Citicorp Company Report, Report No. 1647151, p. 8 of 16.
Machlis, Have it the smart way: Burger King program drives smartcard use, Computerworld, printed Feb. 23, 2001, 1 page.
Here's the calling convenience you asked for: 1-800-call-ATT . . . For All Calls, AT&T, Appendix A: For Card Carriers, 1999, 7 pages.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
How is it Different?, JA8331.
Konrad, IBM Had a Bunch of Unusual Ideas in 2003, www.philly.com, printed Jan. 21, 2004, posted on Jan. 13, 2004, 2 pages.
Incenticard, Bellsouth, JA8329.
Judy Quinn, Incentive Cards Explained, Incentive, Dec. 1995, 5 pages.
Incentive Firms Find Debit Cards a Rewarding Experience (Off-line debit card issuers converge efforts with companies looking for effective incentives to boost employee productivity and to motivate individuals to buy their products), Debit Card News, Vol.
Vincent Alonzo, Incentive Marketing . . . Three if by Smart Card, Incentive Sep. 1995, p. 11.
Incentive gift Card: Another way to give the gift of choice!, Incentive, Aug. 1995, 2 pages.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgift/home.html, printed Apr. 5, 1999.
LexisNexis Academic, Debit Card Innovation, vol. XXXV, No. 5, p. 2, May 1997.
LexisNexis Academic, Debit Cards: Payroll Card Ups Fees, Future Banker, p. 18, Oct. 6, 1997.
LexisNexis Academic, NTS' TransPay Debit Card Helps Remote and Unbanked Employees Get Funds Quicker, Financial News, Mar. 18, 1997.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.

Maritz, Incentive, Jun. 1996, p. 111.
Meridian Award Cards, JA8251.
Meridian—the leader in card marketing, JA8343.
Meridicard vs. Debit Cards, JA7917.
Clark, Microsoft, Visa to Jointly Develop PC Electronic-Shopping Software, The Wall Street Journal, Nov. 9, 1994, WSJ B9.
More Retailers Turn to Co-Branding, Chain Store Age Executive with Shopping Center Age, Feb. 1, 1995, 3 pages.
Bogle, Mutual Funds at the Millennium: Fund Directors and Fund Myths, The Vanguard Group to the '40 Act Institute of PLI (Practicing Law Institute), New York, NY, May 15, 2000, 15 pages.
New 1-800-Call-ATT Campaign Promotes One Number for All Calls, AT&T Marketing, News Release, www.att.com/press/0297/970217.csa.htm, Feb. 17, 1997, 2 pages.
Schwab, Charles, Now 7 Ways for a better Total Return for Your Money; Schwat 1, The Inventor's Asset Management Account, Charles R. Schwab, Charles Schwab & Co., Inc., 16 pages.
Allen et al., Overview of Smart Cards and the Industry, Smart Cards: Seizing Strategic Business Opportunities, Chapter 1, p. 2-20, Irwin Professional Publishing, 1997.
Paper or Plastic? With these three incentives, The Choice is Yours, Incentive, Feb. 1996, 2 pages.
Dugas, Payroll May Ask: Paper or Plastic?, USA Today, 3B, Aug. 14, 2001, 1 page.
Proton world and Europay to co-operate in creation of new CEPS-compliant e-purse application, Press Release 1999, Waterloo, Belgium, Jun. 28, 1999, 2 pages.
Brown et al., Purchasing Card Magic: Eli Lilly Finds Accounts Payable Flying High With Plastic, Corporate Cashflow, vol. 15, No. 12, Nov. 1994, 2 pages.
Purse Application for Cross Border Use in Euro, Cordis, Pace 1st 1999-11531 Pace, www.cordis.lu, printed Feb. 23, 2001, 3 pages.
SK100 Smart Card Electronic Purse Balance Reader, SK100 Balance Reader, http://perso.wanadoo.fr, printed Feb. 23, 2001, 1 page.
Miller, Section E.2.1: Kerberos Authentication and Authorization System, Project Athena, Cambridge, MA, Dec. 21, 1987, 39 pages.
Souccar, Smart Cards: 1st Union Smart Card Pilot Enlists a Second Army Base, American Banker, Digital Frontiers, vol. 164, No. 61, Mar. 31, 1999, 3 pages.
Smart Cards: Big Brother's Little Helpers, The Privacy Committee of New South Wales, No. 66, Aug. 1995.
Smart card for loyalty and e-purse applications eclipses capability of conventional mag-stripe cards, Press Release, www.1.sib.com, Apr. 21, 1997, printed Feb. 23, 2001, 3 pages.
SmartAxis: Load Cash on to your E-Purse Card, Supported Currencies and Schemes, www.smartaxis.co.uk, printed Feb. 23, 2001, 9 pages.
Spurgin, Sopininmon! or What's Happening in the Retail Credit Card Environment, Credit World Journal, vol. 85, No. 4, Mar. 1, 1997, pp. 20-23.
Lacker, Stored Value Cards: Costly Private Substitutions for Government Currency, Economic Quarterly, 1996, Economic Quarterly, v82, n3, p1(25), ISSN: 1069-7225, 17 pages.
Lazarony, Stuck for a gift? Give a prepaid credit card, www.bankrate.com, Dec. 21, 1998, 1 page.
Key, Swift Gift 'Wows' Internet Shoppers, PR Newswire, www.key.com/swiftgift/home.html, Dec. 2, 1998, 1 page.
The Campus Card Conundrum, Card Technology, Journal ISSN: 1093-1279, p 25+, Feb. 1998, pp. 1-8.
The Electronic Purse Reaches the Car Park, http:\\docs.vircom.net/mobility/parking, printed Feb. 23, 2001, 2 pages.
The Evolution of a New Consumerism, Chain Store Age, vol. 73, Jun. 1997, pp. 8-9.
The Federal Transit Administration, TCRP Report 32 Multipurpose Transit Payment Media, Chapter 2 Multipurpose Fare Payment: Overview, p. 10-20.
Stoughton, The Gift of Credit, www.washingtonpost.com/wp-srv/business, Dec. 14, 1998.
Nora Wood, The Power of the Card, Incentive, Jul. 1997, 6 pages.
Stuber, The electronic purse: An overview of recent development and issues, Bank of Canada, Technical Report No. 74, www.bankofcanada.ca, Jan. 1996, printed Feb. 23, 2001, 2 pages.

Understanding the benefits: Smartcity offers a number of important benefits to both the card issuers and their customers, http://www.icl.com/smartcards/benefits.htm, printed Feb. 27, 2001, 2 pages.

Langheinrich et al., Unintrusive Customization Techniques for Web Advertising, Computer Networks, vol. 31, 1999, pp. 1259-1272.

Universal Card free lifetime membership extended 3 months, AT&T Marketing, www.att.com/press/0297/970217.csa.html, Dec. 4, 1990, 2 pages.

Visa Cash—Where can I get it?, www.visa-asia.com/pd/cash/where.html, Feb. 23, 2001.

Visa Cash, www.visa-asia.com/pd/cash/main.html, Feb. 23, 2001.

Visa International and SERMEPA Announce Plans for Cross Border Visa Cash Based on CEPS, www.visa.com/av/news/praamisc111699.vhtml, Nov. 16, 1999.

Visa first to launch electronic purse load via GSM mobile phone, www.cellular.co.za, Johannesburg, ZA, printed Feb. 23, 2001, 4 pages.

Visa releases visa cash electronic purse specifications based on CEPS, www.visa.com/av/news/PRaamisc042099.vhtml, San Francisco, Apr. 20, 1999.

Hansell, Visa to unveil electronic purse cards, New York Times, printed Feb. 23, 2001, 2 pages.

Welcome to Card Express CardEx, CardEx website archived by web.archive on Oct. 31, 1996, http://web.archive.org/web/*/http://www.cardex.com, retrieve Oct. 18, 2003, 7 pages.

Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.

Swiftgift, Welcome to Swiftgift, www.swiftgiftcard.com, Dec. 8, 1998, 10 pages.

Kenneth Hein, What's the Deal?, Incentive, Jul. 1998, 7 pages.

Machlis et al., Will smart cards replace ATMS?, Computerworld, printed Feb. 23, 2001, 3 pages.

Definition of Store-Value Card, Wikipedia, retrieved from the internet at http://en.wikipedia.org/wiki/Stored-value_card, retrieved from the internet on Apr. 16, 2007.

* cited by examiner

METHOD AND SYSTEM FOR PROVIDING PRE-APPROVED TARGETED PRODUCTS

CROSS-REFERENCE TO RELATED APPLICATIONS

This patent application claims priority to U.S. Provisional Patent Application No. 60/398,835, filed Jul. 29, 2002, which is hereby incorporated by reference herein in its entirety.

FIELD OF THE INVENTION

The present invention relates generally to providing targeted products and, more particularly, to a method and system for offering a pre-approved line of credit for one or more targeted products and/or services to a consumer (e.g., individual, small business or other consumer entity).

BACKGROUND OF THE INVENTION

A better understanding of a consumer's spending habits generally leads to more effective marketing and better use of resources. Oftentimes, large amounts of resources are wasted on mass marketing, especially to customers who have no interest in purchasing certain products or services. For example, a consumer with no interest in golf will generally have no desire to purchase a set of top-of-the-line golf clubs, no matter how attractive the deal. Likewise, a young couple with several young children with limited resources will find it difficult to finance a dream vacation in Hawaii. There are even instances where the targeted product or service may be exactly what the consumer wants; however, the consumer may not be able to afford or finance the actual targeted product or service. For example, a financially struggling college student may have a difficult time financing the newest entertainment center. Based on consumer spending data, it may be possible to target the right consumers with the right product. However, even those consumers may not be eligible financially. As a result, targeted data and marketing efforts are wasted.

Generally, targeted products are limited to smaller purchases or less expensive products. Offering large ticket targeted products to consumers may be inefficient as the consumers may not be able to finance the targeted product. Although the product may be exactly what the consumer is looking for, the consumer may be further required to obtain separate financing, which may vary in terms of rates and restrictions, thereby hindering the purchase. In some instances, the consumer may not be able to afford the purchase or have the appropriate credit standing to receive financing for the product thereby resulting in wasted marketing resources and efforts.

In view of the foregoing, it would be desirable to provide a method and system for providing targeted products which overcomes the above-described inadequacies and shortcomings.

SUMMARY OF THE INVENTION

According to an embodiment of the present invention, a method and a system offers a consumer or business an opportunity to purchase one or more targeted products and/or services with a pre-approved credit line where the selection of one or more products is based on consumer or business related profile information, which may include previous spending habits, previous transactions and/or other information.

According to an exemplary embodiment of the present invention, a computer implemented method for offering one or more targeted products with pre-approved credit to a consumer comprises the steps of analyzing consumer information for determining one or more targeted products specific to the consumer; examining credit history data related to the consumer for determining a credit instrument specific to the one or more targeted products; pre-approving the credit instrument for the one or more targeted products; and offering the consumer the one or more targeted products with the pre-approved credit instrument.

According to another exemplary embodiment of the present invention, a computer implemented system for offering one or more targeted products with pre-approved credit comprises an analyzing module for analyzing consumer information for determining one or more targeted products specific to a consumer; an examining module for examining credit history data related to the consumer for determining a credit instrument specific to the one or more targeted products; a credit approval module for pre-approving credit for the one or more targeted products; and an offering module for offering the consumer the one or more targeted products with the pre-approved credit instrument.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

According to an embodiment of the present invention, a method and system provide a consumer an opportunity to purchase one or more targeted products and/or services with a pre-approved credit line (or other pre-approved credit instrument) where the selection of one or more targeted products and/or services may be based on consumer specific information, such as profile data, spending habit data and/or other information. Consumer credit information and other related data may also be considered in determining pre-approved credit or even whether credit approval is available for a particular consumer.

Figure 1:
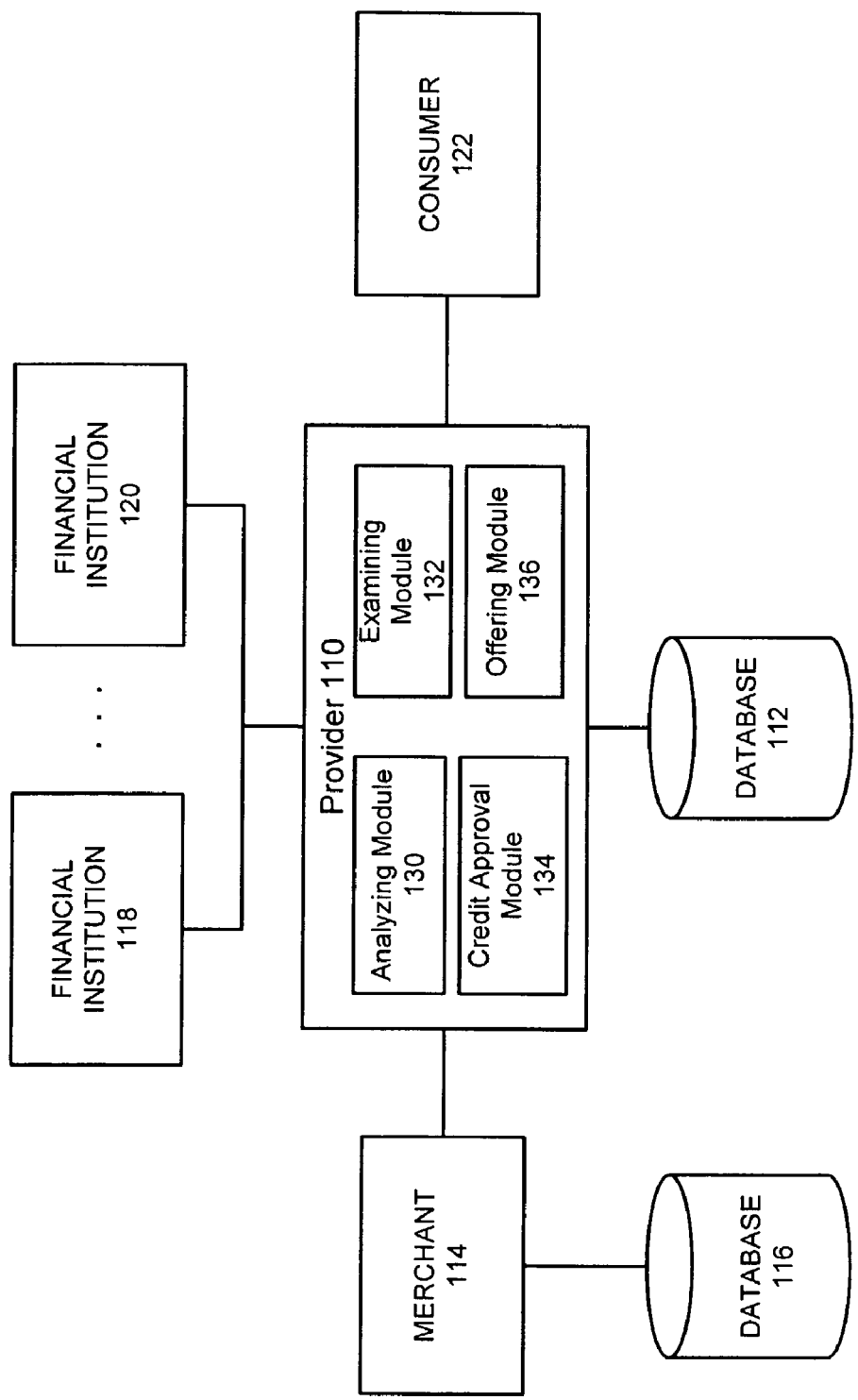
FIG. 1 is a diagram of a system for providing pre-approved credit to a consumer for one or more targeted products and/or services, according to an embodiment of the present invention.

FIG. 1 is a diagram of a system for providing pre-approved credit to a consumer for one or more targeted products and/or services, according to an embodiment of the present invention.

Provider 110 may obtain consumer data from database 112 or other sources of data. Database 112 may represent a plurality of databases from a plurality of sources. Consumer data may include profile data, transaction data, spending habit data and/or other data indicating a consumer's purchase preferences.

Provider 110 may also obtain information from one or more merchants, as represented by Merchant 114. Merchant 114 may provide merchant specific data from database 116. Merchant specific data may provide information related to a consumer's preference in merchants and brands. In addition, such information may provide data related to types of purchases made and frequency of purchases associated with a specific merchant or merchants. For example, by examining merchant specific data, it may be evident that a particular consumer is an avid golfer with a habit of purchasing new golf clubs every year. Merchant specific data may reveal that the consumer consistently upgrades golf clubs by the same maker or that the consumer likes to switch to different brands each year. Merchant 114 may represent a plurality of individual or related merchants. Database 116 may represent a plurality of databases.

Consumer data and other information may be analyzed by Analyzing Module 130 for determining one or more targeted products and/or services. The type of product or service offered to the consumer may vary based on consumer data. For example, Analyzing Module 130 may determine that a consumer may be a likely purchaser of a particular type of digital camera based on certain consumer data. In another example, Analyzing Module 130 may determine that a consumer may be a likely purchaser of a set of golf clubs by a specific maker or group of makers based on certain consumer data. In addition, the Analyzing Module 130 may determine that a majority of consumers may be interested in a universal product or service. For example, consumer data may reveal that most consumers upgrade cell phones, or other product or service, within a couple years. Therefore, an embodiment of the present invention may reveal one or more specific targeted products (or services) for a consumer as well as general targeted products (or services).

After determining one or more targeted products and/or services, Provider 110 may acquire pre-approved financing for consumer 122 from one or more Financial Institutions represented by 118, 120. Other instruments or sources of financing may be available as well. Examining Module 132 may examine consumer credit information, such as credit history and/or other information related to a consumer for determining a consumer's credit standing as well as a consumer's credit rating or credit worthiness, for example. Consumer credit information may also include information obtained from credit bureaus, internal information from merchants and/or other providers, historical information, payment information, delinquency information and/or other sources of credit information. Based on the information gathered, Credit Approval Module 134 may pre-approve credit for one or more targeted products and/or services. Pre-approved credit may include any instrument that allows a consumer to purchase a product or service without full payment upfront from the consumer. For example, pre-approved credit may include a line of credit, an installment based plan (e.g., $50 a month for 36 months) and deferred payment at an interest rate. The various terms (e.g., pricing, duration, up-front amount, interest rate, timing, etc.) of the pre-approved credit instrument may vary depending on factors, such as the consumer's credit worthiness or credit rating. Thus, an embodiment of the present invention may provide a pre-approved credit instrument for a targeted product or service in accordance with risk-based pricing which may involve information related to consumer credit worthiness as well as the likelihood that the consumer will pay the full purchase price. The pre-approved credit may also be specific for the targeted product and/or service.

For example, there may be circumstances where one or more targeted products or services are determined for a consumer. However, the Examining Module 132 may reveal that the consumer is not qualified for the pre-approved credit or financing. For example, the consumer may be in default or may have a history of making late payments. In this scenario, an embodiment of the present invention may then determine one or more other products that may involve a lesser degree of financing or financing with less risk. Thus, rather than pre-approve a consumer for a digital television, an embodiment of the present invention may pre-approve the consumer for a DVD player instead, for example. In addition, other financial instruments may be offered to the consumer. For example, for more risky consumers, an advanced payment alternative may be available where the consumer may be required to pay more upfront and finance the remaining amount. Other options may be available.

According to another example, a first consumer and a second consumer may be offered essentially the same product, such as a computer. Based on credit information, the first consumer may be deemed more credit worthy than the second consumer. While both consumers are offered essentially the same computer, the first consumer may also be offered additional memory, a printer and additional upgrades based on the first consumer's high credit rating or other indicia of credit worthiness. An embodiment of the present invention may perform a risk-based analysis in determining the type of targeted product as well as the type of pre-approved credit.

According to another example, the consumer may also include a business, such as a small business entity or other consumer entity. For example, a small business may receive an offer for a new office suite of equipment with pre-approved credit. The pre-approved credit may be based on credit information associated with the small business, such as amount of debt, amount (or likelihood of receiving) funding, types of clients or customers, likelihood of success as well as other information. Based on the credit information associated with the small business, the office suite of equipment may include state of the art office equipment. In another example, the office suite of equipment may include standard office essentials. The type of office equipment may also be tailored to the type of small business. For example, for a graphics art business, equipment related to computer graphics may be offered. For a retail company, basic computer equipment for bookkeeping, a fax machine and other equipment may be offered. In addition, the type of pre-approved credit instrument may also vary based on the credit worthiness of the small business. For example, the suite of office equipment may be offered at a higher interest rate for a small business involving a more risky business venture.

Provider 110, via Offering Module 136, may then approach Consumer 122 with an offer allowing purchase of the one or more targeted products (or services) with the pre-approved credit or financing. Consumer 122 may be an individual, small business, large business or other consumer entity. Offering Module 136 may also determine a preferred mode(s) of communication. For example, it may be determined that a consumer may prefer email offers to a private email account as opposed to conventional mail offers. Other consumers may prefer phone offers or text messages on a mobile device. Therefore, the most effective medium(s) may be used for contacting the consumer. Each module or combination of modules may be supported by a separate entity which is distinct from Provider 110. In addition, each module or a combination of modules may be supported by Provider 110.

Figure 2:
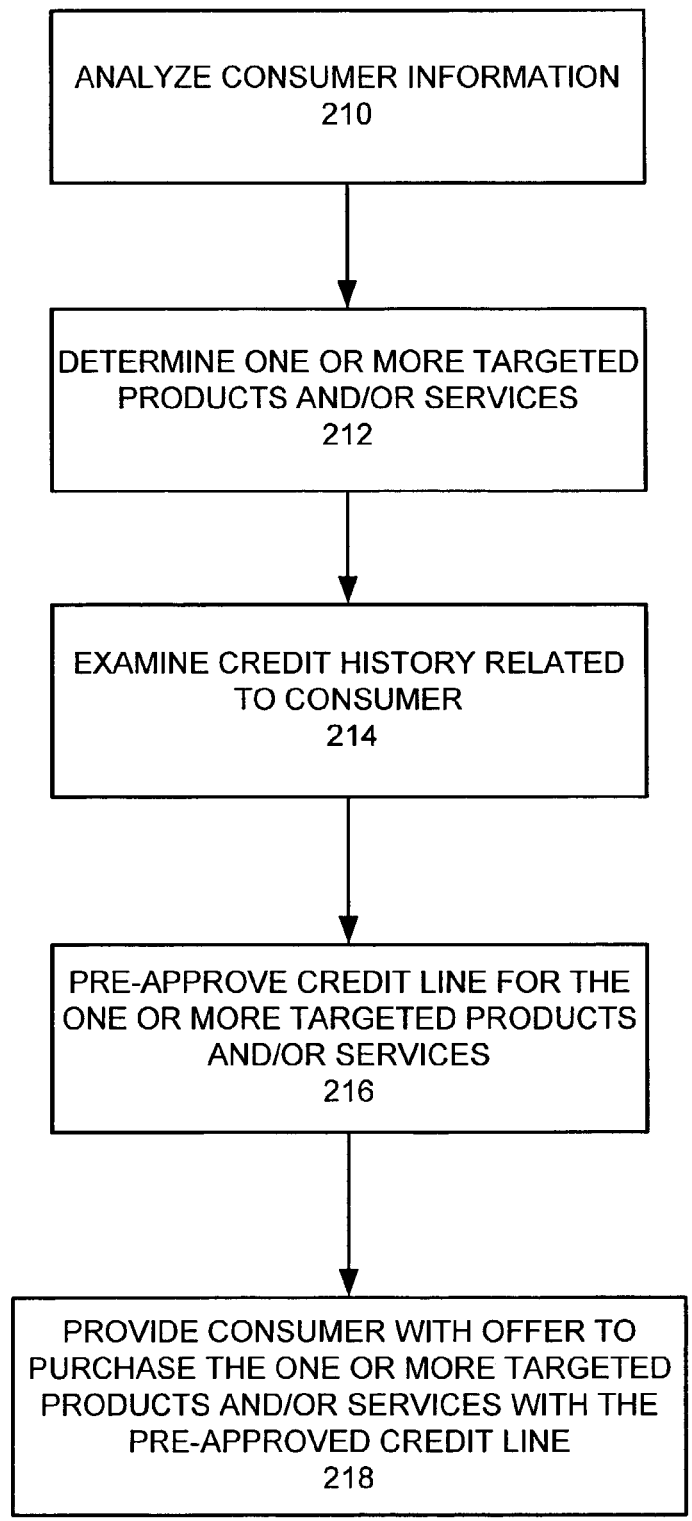
FIG. 2 is a flowchart illustrating a method for providing pre-approved credit to a consumer for one or more targeted products and/or services, according to an embodiment of the present invention.

FIG. 2 is a flowchart illustrating a method for providing pre-approved credit to a consumer for one or more targeted products and/or services, according to an embodiment of the present invention. At step 210, consumer information may be retrieved and analyzed. Consumer information may include consumer profile data, transaction data, merchant related data and/or other information. Consumer information may also include consumer credit information which may be obtained from a variety of sources, such as credit bureaus, internal sources, merchants, service providers and/or other sources of consumer information. At step 212, one or more targeted products (or services) may be determined based at least in part on the consumer information. In addition, certain add-ons or other benefits may be determined for the consumer. At step 214, credit history and other credit information related to the consumer may be examined by a Provider, one or more financial institutions and/or other entity. Credit history information may be examined to determine an appropriate extension of credit or other pre-approved credit instrument available to the consumer. For example, it may not be financially feasible or practical to extend credit to a consumer who is heavily in debt or otherwise not likely to make payments. At step 216, a credit line (or other financing product or service) may be pre-approved for the purchase of one or more targeted products (or services) by the consumer. At step 218, the consumer may be approached with an offer to purchase the one or more targeted products (or services) with the pre-approved credit. The offer may be made to the consumer via a preferred mode(s) of communication.

For example, a pre-approved offer for a computer or a video camera for $20 per month for 3 years may be sent to a consumer. Offers may also include add-ons, such as Internet and bill pay service for computers, extra memory for cameras, etc. Another component of the offer may include risk-based pricing/offers. For example, a consumer with excellent credit may receive a top of the line camera for $25 per month (since this consumer's interest rate will be low) whereas a person with moderate credit may receive a lower priced camera for the same monthly cost. Therefore, different products for the same price may be offered to different consumer or different prices for the same product may be offered to different consumer. By using risk-based pricing, the most useful pre-approved offer may be sent to the most eligible consumers.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A computer implemented method for offering one or more targeted products with pre-approved credit to a consumer wherein the method is executed by a programmed computer processor, the computer implemented method comprising the steps of:

analyzing, by a computer processor, consumer information for determining one or more targeted products specific to the consumer using the programmed computer processor, wherein the consumer information comprises one or more of consumer related profile data, transaction data and spending habit data;

examining, by the computer processor, credit history data related to the consumer for determining a credit instrument specific to the one or more targeted products;

pre-approving, by the computer processor, the credit instrument for the one or more targeted products; and offering, by the computer processor, the consumer the one or more targeted products with the pre-approved credit instrument; wherein the pre-approved credit instrument is provided for financing the one or more targeted products, wherein the offering of the one or more targeted products with the pre-approved credit instrument is performed independent of consumer input and is performed prior to the consumer entering into a transaction for the one or more targeted products.

2. The method of claim 1, wherein the consumer information is retrieved in part from one or more merchants.

3. The method of claim 1, wherein the pre-approved credit instrument is associated with one or more financial institutions.

4. The method of claim 1, wherein the pre-approved credit instrument comprises a plurality of credit terms that are based on the credit history data associated with the consumer.

5. The method of claim 1, further comprising the step of:

determining, by the computer processor, one or more add-ons specific to the one or more targeted products based on the credit history data.

6. The method of claim 1, wherein the step of offering further comprises the step of determining, by the computer processor, a preferred one or more modes of communication for offering the one or more targeted products with the pre-approved credit instrument.

7. The method of claim 1, wherein the one or more targeted products comprises one or more targeted services.

8. The method of claim 1, wherein credit history data comprises data associated with delinquency of payments and timeliness of payments.

9. The method of claim 1, wherein credit history data comprises data indicating credit worthiness.

10. A computer implemented system for offering one or more targeted products with pre-approved credit, the computer implemented system comprising:

a programmed computer processor, the programmed computer processor comprising at least the following:

an analyzing module for analyzing consumer information for determining one or more targeted products specific to a consumer, wherein the consumer information comprises one or more of consumer related profile data, transaction data and spending habit data;

an examining module for examining credit history data related to the consumer for determining a credit instrument specific to the one or more targeted products;

a credit approval module for pre-approving credit for the one or more targeted products; and an offering module for offering the consumer the one or more targeted products with the pre-approved credit instrument; wherein the pre-approved credit instrument is provided for financing the one or more targeted products, and wherein the customer is offered the one or more targeted products with the pre-approved credit instrument independent of consumer input and prior to the consumer entering into a transaction for the one or more targeted products.

11. The system of claim 10, wherein the consumer information is retrieved in part from one or more merchants.

12. The system of claim 10, wherein the pre-approved credit instrument is associated with one or more financial institutions.

13. The system of claim 10, wherein the pre-approved credit instrument comprises a plurality of credit terms that are based on the credit history data associated with the consumer.

14. The system of claim 10, wherein the analyzing module further determines one or more add-ons specific to the one or more targeted products based on the credit history data.

15. The system of claim 10, wherein the offering module further determines a preferred one or more modes of communication for offering the one or more targeted products with the pre-approved credit instrument.

16. The system of claim 10, wherein the one or more targeted products comprises one or more targeted services.

17. The system of claim 10, wherein credit history data comprises data associated with delinquency of payments and timeliness of payments.

18. The system of claim 10, wherein credit history data comprises data indicating credit worthiness.

\* \* \* \* \*